UNITED STATES PATENT OFFICE.

WILLIAM ADAMSON AND CHARLES F. A. SIMONIN, OF PHILADELPHIA, PENNSYLVANIA, ASSIGNORS TO WILLIAM ADAMSON.

IMPROVEMENT IN THE TREATMENT OF GRAIN FOR THE MANUFACTURE OF STARCH, SPIRITS, &c.

Specification forming part of Letters Patent No. 147,353, dated February 10, 1874; reissue No. 6,226, dated January 12, 1875; application filed August 26, 1874.

*To all whom it may concern:*

Be it known that we, WILLIAM ADAMSON and CHARLES F. A. SIMONIN, of Philadelphia, county of Philadelphia, State of Pennsylvania, have invented an Improvement in Treating Grain for the Manufacture of Starch, Spirits, &c., of which the following is a specification:

The object of our invention is to so prepare grain and other farinaceous substances as to facilitate distillation and conversion into starch, and to increase the yield.

We have found that the application of heated hydrocarbons predisposes the farinaceous matter of which it is usual to manufacture alcohol and starch to instant and rapid fermentation, the heat which is essential in carrying our invention into effect stimulating the chemical action of the hydrocarbon.

Grain, corn, roots, nuts, or seeds, either in a whole or crushed condition, may be subjected in a suitable vessel to the direct action of heated hydrocarbons of a volatile character—benzine or benzole, for instance; but we prefer to subject the grain to the action of hydrocarbon vapor under heat and pressure in the following manner:

We place the grain on a perforated diaphragm in a closed vessel containing a supply of the volatile hydrocarbon, which is vaporized by a steam-heated coil or otherwise. The vapor (which may be under more or less pressure) passes upward, and permeates the mass of grain, and soon deprives it of all resinous gummy, oily, and other matter which impedes fermentation, and which descends and finds a lodgment in the bottom of the vessel, below the diaphragm, to be withdrawn from time to time, the vapor, after passing through the grain, being conducted to a cooler, and there condensed prior to being again introduced in a liquid form into the vessel. During this operation the heat of the hydrocarbon has such an effect on the grain as to reduce it to a condition which insures rapid fermentation, thus aiding the hydrocarbon to bring about the desired result.

The fermented product may be converted by the usual process into starch of a superior quality as regards purity and color, owing to the removal from the grain of its coloring ingredients; or the fermented product may be converted, by distillation, into alcohol of better quality than that produced after the ordinary fermenting process.

The yield, whether it be alcohol or starch, is much greater after this rapid fermentation than if the grain is fermented without the preparatory treatment.

We claim as our invention—

The mode described of preparing farinaceous substances for conversion into starch or alcohol, namely, subjecting said substances, prior to such conversion, to the action of heated hydrocarbon, as set forth.

In testimony whereof we have signed our names to this specification in presence of two subscribing witnesses.

CHS. F. A. SIMONIN.
WM. ADAMSON.

Witnesses:
A. P. RUTHERFORD,
HARRY SMITH.